United States Patent [19]

Rasinski

[11] Patent Number: 4,825,194
[45] Date of Patent: Apr. 25, 1989

[54] SINGLE CUE FLIGHT DIRECTOR INDICATOR

[75] Inventor: John E. Rasinski, Albuquerque, N. Mex.

[73] Assignee: Honeywell Inc., Minneapolis, Minn.

[21] Appl. No.: 54,640

[22] Filed: May 27, 1987

[51] Int. Cl.⁴ ............................................. G01C 23/00
[52] U.S. Cl. .................................. 340/975; 340/972; 340/979; 340/951
[58] Field of Search ............... 340/975, 967, 972, 973, 340/979, 980, 951; 73/178 R, 178 H, 178 T; 244/177-181, 183-186

[56] References Cited

U.S. PATENT DOCUMENTS

| | | | |
|---|---|---|---|
| 3,521,227 | 7/1970 | Congleton et al. | 340/975 |
| 3,521,228 | 7/1970 | Congleton et al. | 340/975 |
| 3,691,520 | 9/1971 | Nordstrom | 340/975 |
| 4,283,705 | 8/1981 | James et al. | 340/979 |
| 4,368,517 | 1/1983 | Lovering | 340/972 |
| 4,563,742 | 1/1986 | McElreath | 340/975 |

Primary Examiner—Donnie L. Crosland
Attorney, Agent, or Firm—Arnold L. Albin

[57] ABSTRACT

A flight director command indicator for a cathode ray tube display has a single cue positioned in roll, pitch and translation by combining roll attitude and pitch attitude command signals. It includes cooperating indicia for providing visual commands to bring the aircraft to a predetermined flight path of attitude to satisfy the flight director command.

10 Claims, 3 Drawing Sheets

SINGLE CUE FLIGHT DIRECTOR INDICATOR

BACKGROUND OF THE INVENTION

This invention was made with U.S. Government support and the U.S. Government has certain rights therein.

1. Field of the Invention

The invention relates to indicating instruments, and more particularly to a flight director instrument having a single cue responsive to roll, pitch, and heading of an aircraft.

2. Description of the Prior Act

Aircraft flight director instruments are well known for use in providing visual commands to the pilot. Thrust, pitch attitude, and bank attitude controls are exercised by the human pilot while observing the flight director display. When the pilot manipulates the aircraft controls in a manner to keep the steering cues aligned with corresponding fixed symbols, he will satisfy the pitch and roll attitude control laws so that the aircraft is maintained on predetermined flight path.

The advantages of a command cue which engenders an instantaneous pilot response to move the associated flight control to satisfy the flight director command are discussed in U.S. Pat. No. 3,967,236, filed Mar. 29, 1974 and issued June 29, 1976 and assigned to the Applicant's assignee. A command cue described therein is particularly adapted to simulate the appearance and response of the collective pitch stick of a helicopter. However, the instrument referenced therein provides a multiplicity of steering cues and indicia which must be coordinated by the human pilot.

Such flight director steering cues have in general been provided in two forms—steering bars, adapted for movement up or down to command corresponding changes in pitch and for movement left or right to command bank angle changes, and aircraft symbols, representative of the attitude of the aircraft, which move up and down to command pitch changes and roll left or right to command required bank angle changes.

An indicator for a flight director instrument which is provided with a single cue positioned in roll and pitch to provide visual commands for bringing the craft to a predetermined flight path of attitude is described in U.S. Pat. No. 4,351,187, filed Sept. 15, 1980 and issued Sept. 28, 1982, also assigned to the assignee of the present invention. The single cue has the advantage of minimizing the workload of the human pilot in following the flight director's commands.

However, instruments of the type described suffer from operational and structural deficiencies. As mechanical devices, they require complex and delicate servos, gears, and meter movements which must be accurately calibrated and are expensive to fabricate. Further, from an operational viewpoint, while the pitch cue seems adequate in the case of both the steering bars and aircraft symbol, the roll cue type steering bar translates left or right but does not in itself roll, while the aircraft symbol rolls, but does not translate left or right. Thus, neither device reflects the true attitude of the aircraft, and hence, from a human factors point of view, they do not engender the instinctive response from the human pilot that is desired.

The present invention provides an aircraft-shaped steering cue which moves up and down to command required pitch changes and both translates left and right and rolls in proportion to the required bank angle to command the required change in bank angle.

A further advantage of the present invention is that while it responds to conventional control laws for mechanical flight director instruments, it is adapted for providing a display on the CRT face of an integrated flight instrument display system, such as described in U.S. Pat. 4,247,843, filed Aug. 23, 1978 and issued Jan. 27, 1981.

SUMMARY OF THE INVENTION

A display instrument of the type having a single steering cue displaces the cue in roll, pitch and translation in response to both roll and pitch attitude commands. An aircraft-shaped steering cue is disposed in proximity to a stationary reference index. Input command signals corresponding to roll attitude error and pitch attitude error are combined to deflect the steering cue relative to the reference index and are representative of deviations from a desired flight path. A pitch attitude error results in displacing the cue in a vertical direction, while a bank angle error also displaces the cue in roll and translation relative to the index, the direction of movement corresponding to the required corrective movement of the aircraft controls by the human pilot. When the command signals are satisfied by redirecting the flight path of the aircraft, the steering cue returns to coincidence with the reference index.

DESCRIPTION OF THE PREFERRED EMBODIMENT

Figure 1:
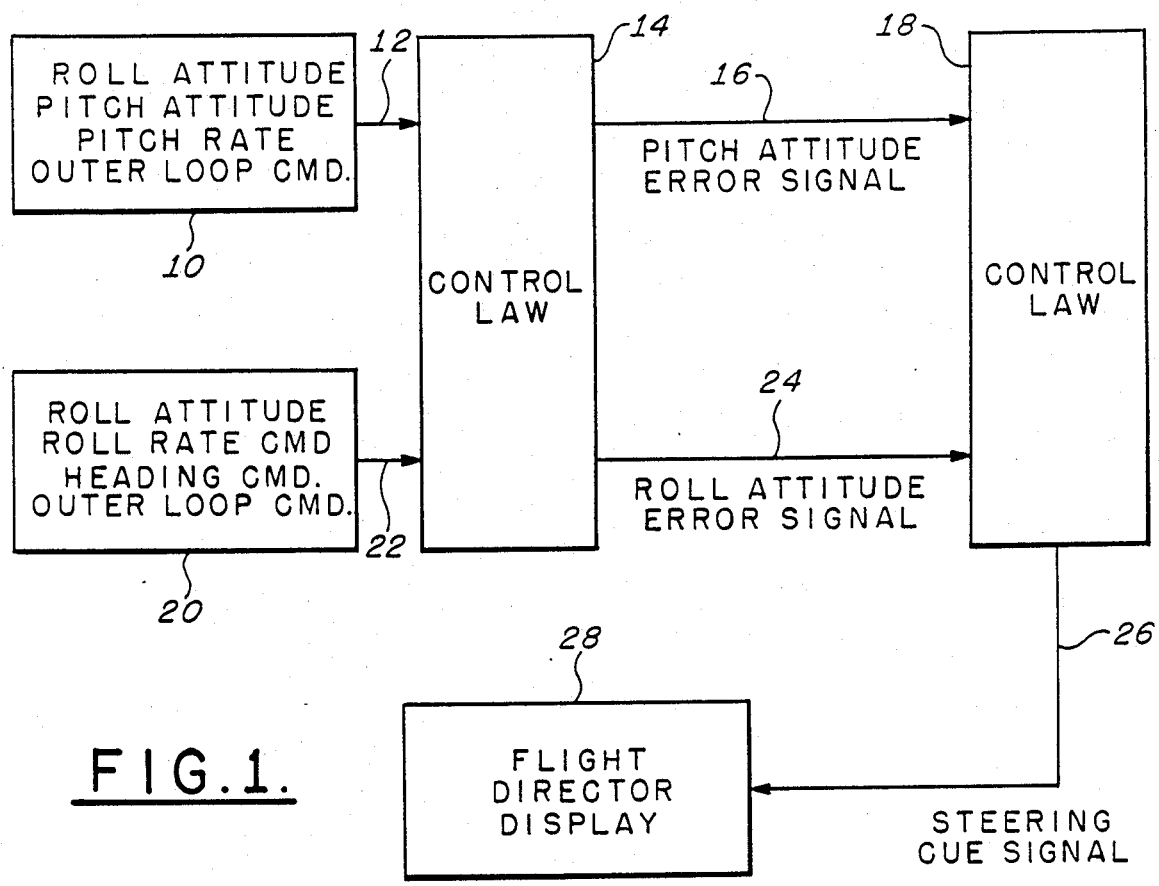
FIG. 1 is a schematic block diagram of a preferred embodiment incorporating the general principles of the present invention.

Before proceeding to a description of the apparatus embodying the inventive concept, reference will be made to FIGS. 1 and 2 for the purpose of discussing the general operational features and requirements of the invention. In FIG. 1, the command signals 10 for providing a pitch attitude error signal 16 may be derived from an inertial navigation system providing pitch attitude, roll attitude and pitch rote. Outer loop command signals may be generated by the inertial navigation system or generated by a conventional flight control system and include radio altitude, altitude references, glide slope deviation and global position signals from a global position system (GPS). The GPS signals are derived from an onboard receiver responsive to satellite ranging emissions, from which positional data may be computed. The command signals and navigational signals are combined by conventional multipliers, summing amplifiers, integrators, and limiters, in accordance with control laws 14 which are well known to those skilled in the art, to derive a pitch attitude error signal 16, which is coupled to a further contral law apparatus 18, whose function is to be described.

In a similar manner, the inertial navigation system provides roll attitude, roll rate, selected heading, localizer deviation, and VOR deviation, distance and bearing. Other data may be provided by well-known onboard aircraft systems, including barometric pressure, pressure altitude, calibrated airspeed, true airspeed, vertical speed, etc. The command signals 20 are transmitted on lead 22 to control law 14, where they are combined to generate the roll attitude error signal 14, which is also applied to control law 18. Control law 18 combines the pitch attitude error signal 16 and the roll attitude error signal 24 to derive a resultant steering cue signal 26. Control law 18 preferably scales the pitch axis error signal such that the steering cue deflects up or down 0.06 inch per degree of pitch attitude error and the roll axis error signal is scaled such that the steering cue banks one degree of roll per degree of roll attitude error and is displaced laterally one inch per 30 degrees of roll attitude error.

The steering cue signal 26 is applied to flight director display 28, which is preferably a cathode ray tube display. The display system of said U.S. Pat. No. 4,247,843 may be configured to provide unique aircraft displays of the type herein described. The display processor in said patent has the capability to generate and load into the symbol memory banks special digital raster formats and to shift the symbology on the face of the CRT in response to the steering cue signal.

Figure 2:
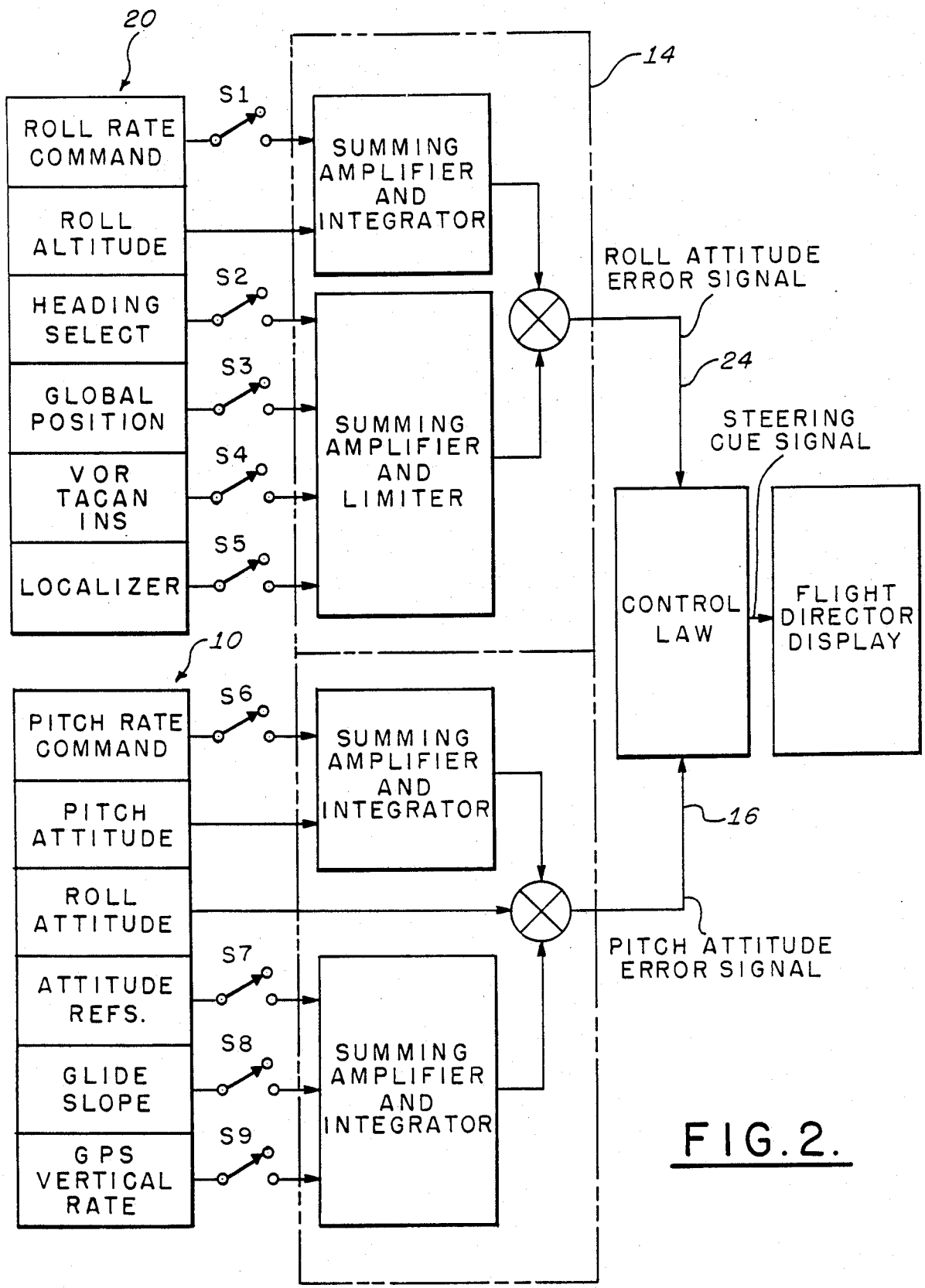
FIG. 2 is a schematic block diagram of a navigation system illustrative of an application of the preferred embodiment.

Referring now to FIG. 2, the roll attitude error signal 24 may be determined by an electrical signal corresponding to the algebraic sum of signals proportional to the displacement of the aircraft from a guidance course, such as the localizer beam of an instrument landing system, the heading of the aircraft relative to the bearing of the course, and the bank angle or roll attitude of the aircraft. The signals applied to the steering cue and flight director display 28 are supplied by the outputs of summing amplifiers, multipliers, integrators, and limiters in accordance with gain control laws 14 and 18 well known to those skilled in the art. Switches S2-S5 are used to select the desired navigational command signals.

The pitch attitude error signal 16 may be derived by an electrical signal corresponding to the vertical displacement of the aircraft from the glide slope beam of an instrument landing system or from a predetermined altitude, a signal proportional to the pitch angle or pitch attitude of the aircraft, or a signal from the global positioning system. The signals from the pitch attitude and pitch rate command sources and the selected navigational commands are applied to summing amplifiers, multipliers, and integrators 14 to provide the pitch attitude error signal 16 to control law 18 and flight director display 28.

Figure 3:
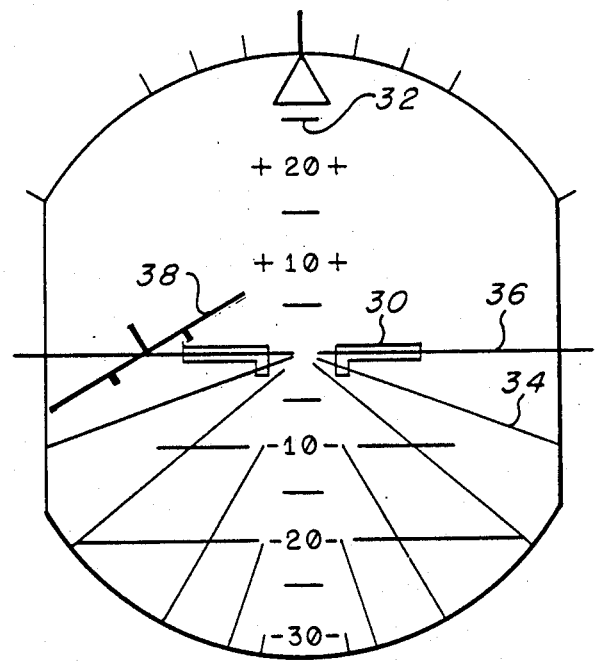
FIG. 3 is pictorial representation of a typical display face of the present invention, showing a steering cue command of 30 left bank.

FIG. 3 shows the instrument display face when the roll attitude error signal is commanding a correction of 30° of left bank. The display includes a stationary reference index 30, comprised of a pair of symbols representing an aircraft with the wings horizontally disposed at 0° of pitch. In order to provide the pilot with a measure of the commanded angle of pitch and commanded angle of roll of the aircraft, the display face is provided with pitch and roll scales. The pitch scale comprises a series of short horizontal index lines 32 calibrated in degrees of pitch, spaced one above the other in a direction parallel to the reference index 30. Typically, the pitch lines denote intervals of 5 degrees deviation. Radiating symmetrically from the center of the display and the reference index 30 are a series of axial lines 34 running between the horizon line 36 and the lower boundary of the display face, disposed at intervals of 10° from the vertical and increasing to 20° at the horizontal. The pilot may also observe an actual change in bank angle by reference to the the angular indices 31 which are preferably calibrated in 10° increments to 30°, and 30° increments to 90° of bank angle.

The steering cue 38 is in the form of an elongated bar generally resembling the shape of an aircraft viewed in a tail-on perspective.

Figure 4:
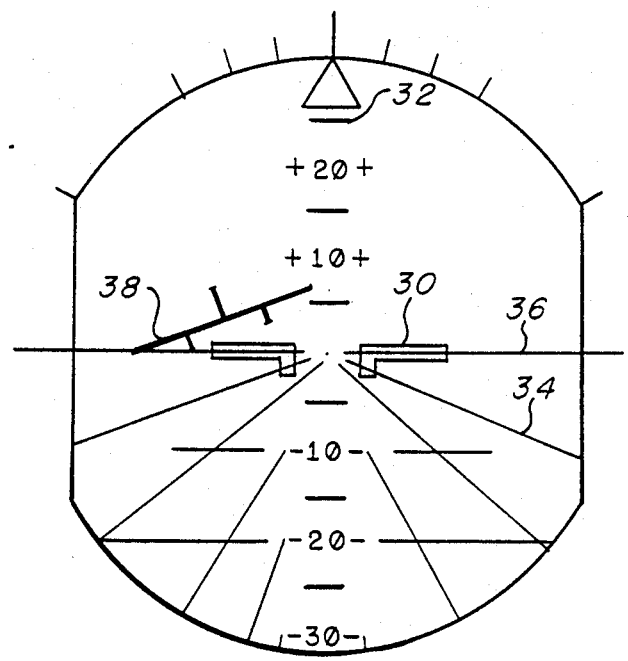
FIG. 4 is a pictural representation of the display face of the present invention, showing a steering cue command of 20 left bank and 3 of pitch up.

The operation of the cue is such that it is normally centrally positioned and aligned with the stationary reference when the steering cue signal is nulled. As shown in FIG. 3, the cue will be angularly disposed in accordance with a commanded departure from the horizontal defined by the reference index, and is moved horizontally when the aircraft departs from a reference course heading. Similarly, as shown in FIG. 4, when the aircraft is commanded to fly 20° of left bank and pitch up 3°, a commanded change in pitch attitude will result in deflecting the movable aircraft symbol up proportionately.

When the human pilot initiates a corrective maneuver in roll, the bank angle will be displayed by the relative position of triangular index 33 with respect to the angular indices 31.

Figure 5:
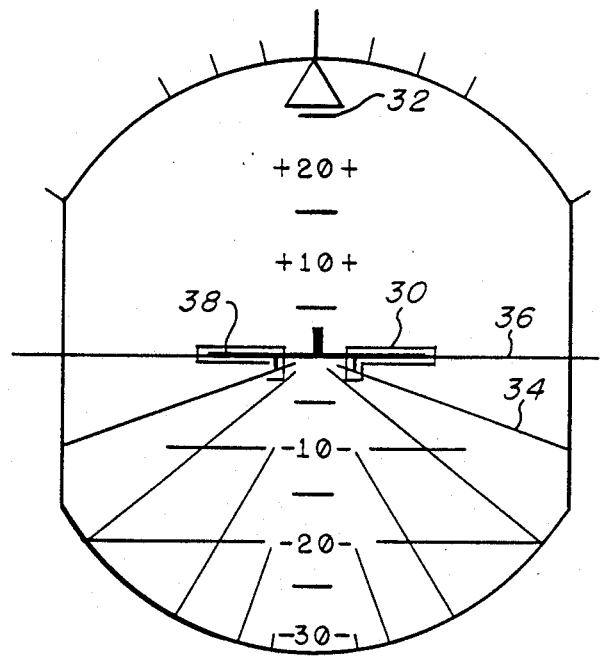
FIG. 5 is a pictorial representation of the display face of the present invention, showing the steering cue position when the cue command is satisfied.

FIG. 5 shows the single cue display with the cue satisfied and aligned horizontally with the stationary reference index.

When the craft departs from a prescribed course, a signal appears at the display whose phase depends on the direction of the departure and whose amplitude depends on the extent of the deviation. Thus the steering cue is controlled not only in accordance with the radio displacement signals of a navigation system, but also in accordance with the craft attitude signals, and in particular the pitch attitude and roll attitude signals. The steering cue will be centered on the reference index, for example, not only when the craft is on a glide slope radio beam of an ILS system, or at a desired selected attitude as determined by the altimeter, but also when the aircraft is off the glide slope beam or attitude but in a pitch attitude which will return the craft to the glide path or selected attitude. The pilot is informed by movement of the steering cue the extent of aircraft control in pitch which must be applied to zero the steering cue and attain the commanded course.

The present invention has advantages from point of view of the human pilot. The cue appears as though it is an aircraft in front of the pilot with which he can fly in trail formation. In commanding a left bank, for instance, the steering cue rolls left and translates left (see FIGS. 3 and 4). As the pilot rolls to satisfy the cue, the cue apears to move as though he were following an aircraft. That is, as he rolls toward the cue, not only does he appear to match the leading aircraft's bank angle but it also appears that the cue moves toward the center of the display, as a real aircraft in front of him would appear as he rolled towards it. This is a very natural cue promoting an instinctive corrective action from the pilot. In addition, the steering cue provides two redundant cues to the pilot regarding the commanded bank angle: (1) bank angle of the cue and (2) lateral displacement of the cue from the center of the display.

A further advantage is that the cue does not saturate at extreme commands, as occurs with prior art display indicators. Aircraft symbols which display pitch and roll but do not also translate left and right have been limited in the extent of bank angle commanded. The improved steering cue of the preferred embodiment when driven by a roll error command signal is caused to roll and translate left or right to the limits of the display, but will continue to roll to cue the pilot even as to extreme bank angles, since the cue is not inherently saturated at the limits of the display. This is a significant advantage for highly maneuverable aircraft. Further, since the control laws which generate the pitch and roll command signals are the same as those provided for conventional flight director indicators, only minimal additional circuitry is required to generate the combined signal to drive the single cue.

For clarity and understanding of the invention, it has been explained by using a generally analog format as shown in FIG. 2, it being understood that the same analog format may also represent the programming of a programmable digital computer wherein the various analog inputs are converted to digital signals for digital processing.

While the invention has been described in its preferred embodiment, it is to be understood that the words which have been used are words of description rather than of limitation, and that changes within the purview of the appended claims may be made without departing from the true scope and spirit of the invention in its broader aspects.

Embodiments of the invention in which an exclusive property or right is claimed are defined as follows:

1. Display apparatus for an aircraft having a roll axis and a pitch axis and having a display face for indicating to the pilot the pitch and roll attitudes and horizontal translation of the aircraft with respect to said axes, comprising:

a stationary reference index indicative of a zero error command signal, said index being horizontally and centrally disposed with respect to said display face, an elongated steering cue generally resembling the shape of an aircraft viewed in a tail-on perspective, said steering cue being moveable in roll, pitch and translation with respect to said stationary reference index, and being normally disposed in coincidence with said stationary reference index, means for providing roll attitude and pitch attitude error signals representative of deviations from a predetermined flight path, and means for combining said roll attitude and pitch attitude signals and for applying said combined signals to said steering cue, so that said steering cue is commanded to a predetermined vertical deviation relative to said stationary index in response to said pitch attitude error signal and to a predetermined bank angle and horizontal deviation relative to said stationary index in response to a commanded bank angle, and for restoring said steering cue to substantial coincidence with said stationary reference index when said command signals are satisfied by redirecting the flight path of the aircraft so that said roll attitude error signal and said pitch attitude error signal have a null value.

2. The display apparatus as set forth in claim 1 wherein said display face comprises the face of an electroluminescent display.

3. The display apparatus as set forth in claim 2, wherein said display comprises the face of a cathode ray tube.

4. The display apparatus as set forth in claim 3, further comprising a plurality of horizontal index marks vertically disposed on said display face and indicative of a predetermined pitch attitude of the aircraft.

5. The display apparatus as set forth in claim 4, wherein said steering cue is scaled with respect to said pitch axis to deflect 0.06 inch per one degree of pitch attitude error signal.

6. The display apparatus as set forth in claim 5, further comprising a plurality of index marks radially disposed on said display face and indicative of a predetermined bank angle of the aircraft.

7. This display apparatus as set forth in claim 6, wherein said steering cue is scaled with respect to said roll axis to bank one degree of roll per one degree of roll attitude error.

8. The display apparatus as set forth in claim 7, wherein said steering cue is scaled with respect to said roll axis to displace laterally one inch per 30 degrees of roll attitude error.

9. An attitude indicator for aircraft comprising an indicator element adapted to be positioned in accordance with the roll and pitch of said aircraft, said indicator element having the general shape of an aircraft in silhouette, including a first elongated member extending generally laterally and representative of the wing portions of said aircraft, a second bar-shaped member extending orthogonally from said first member and centrally and upwardly disposed thereupon, representative of the stabilizer portion of said aircraft, and third and fourth bar-shaped members of equal length, disposed equidistant from said second member and extending downwardly and parallel to said second member and representing the landing gear portions of said aircraft, said second member having a predetermined length exceeding the length of said third and fourth members.

10. An attitude indicator as set forth in claim 9, further comprising indicia means cooperating with said indicator element for indicating the value of a commanded roll angle or a commanded pitch angle of said aircraft when said indicator element is displaced relative to said indicia means, and further comprising cooperable pointer and scale means responsive to bank angles of the aircraft for indicating the bank angle thereof.

* * * * *